United States Patent [19]

Patel

[11] 4,351,913

[45] Sep. 28, 1982

[54] FILLING MATERIALS FOR ELECTRICAL AND LIGHT WAVEGUIDE COMMUNICATIONS CABLES

[75] Inventor: Naren I. Patel, Hickory, N.C.

[73] Assignee: Siecor Corporation, Hickory, N.C.

[21] Appl. No.: 336,560

[22] Filed: Jan. 4, 1982

Related U.S. Application Data

[62] Division of Ser. No. 235,922, Feb. 19, 1981, Pat. No. 4,324,453.

[51] Int. Cl.³ ............................................. C08J 9/32
[52] U.S. Cl. ................................... 523/218; 523/219; 521/54; 521/98; 521/140; 521/139
[58] Field of Search ............... 521/54, 98, 139, 140; 523/218, 219

[56] References Cited

U.S. PATENT DOCUMENTS

| | | | |
|---|---|---|---|
| 3,856,721 | 12/1974 | Frilschel | 521/54 |
| 4,107,134 | 8/1978 | Dawans | 521/54 |
| 4,108,806 | 8/1978 | Cohrs et al. | 521/54 |
| 4,247,652 | 1/1981 | Matsuda et al. | 521/140 |
| 4,252,712 | 2/1981 | Donermeyer et al. | 521/54 |
| 4,255,524 | 3/1981 | Dawans | 521/54 |
| 4,324,453 | 4/1982 | Patel | 428/372 |

Primary Examiner—Morton Foelak
Attorney, Agent, or Firm—Roy B. Moffitt

[57] ABSTRACT

Disclosed are materials used to fill electrical and light waveguides transmitting communications cables to make them waterproof. The filling materials have superior waterproofing, dielectric and handling characteristics and are made from compounds of styrene-ethylene-butylene-styrene, styrene-butadiene-styrene or styrene-isoprene-styrene type block copolymers dissolved in paraffinic or naphthenic type mineral oils with a minimal content of aromatic hydrocarbons, inorganic hollow microspheres and, if desired, an additive such as low molecular weight polyethylene or glycerol hydroxy stearate.

3 Claims, 5 Drawing Figures

FILLING MATERIALS FOR ELECTRICAL AND LIGHT WAVEGUIDE COMMUNICATIONS CABLES

This is a division of application Ser. No. 235,922 filed Feb. 19, 1981 now U.S. Pat. No. 4,324,453.

BACKGROUND OF THE INVENTION

Nearly all communications cables now being installed in domestic communications systems are buried beneath the ground. Such buried cables include not only cables composed of insulated electrical conductors such as insulated copper wire, but also optical waveguide cables composed of glass or other materials. Most of these cables are waterproofed because of the antagonistic environment factors present underground, water being the chief concern.

U.S. Pat. No. 4,176,240 reports that attempts to waterproof buried cable began nearly one-hundred years ago, but were not successful in the practical sense until the production of plastic insulated cable (PIC) during the 1950's. PIC cables with dual plastic coatings have been reported successfully buried in dry environments. Up to 1950, it was a general practice in buried cable installations, where water was a problem, to pressurize the interior of the cable. This practice was successful in excluding water from the cable interior; however, pressurized cable is expensive to maintain and for this reason has fallen from general use. Unpressurized PIC cables fail to solve the water problem because water migrates through the plastic jacket into the interior of the cable and disrupts or deteriorates communication service. Water can permeate a PIC sheath through a localized opening and thereafter is free to follow any channel within the cable as far as physical forces will allow, often hundreds of feet, to accumulate and flood a localized cable segment. This water not only upsets the capacitance balance of electrical transmission lines, but also introduces potential corrosion which, after an extended time, tends to deteriorate the useful life of the water soaked transmission medium. Water flooding a cable containing optical waveguides can be deleterious to optical transmission.

One solution widely adopted in an attempt to solve the problem of water in a communications cable is to fill the interior of the cable, not otherwise occupied by the conductors, with an insoluble filling material that would have the propensity to plug the cable and stop the channeling of water and thus flooding of a particular segment. It has been said many times and recently restated in U.S. Pat. No. 4,176,240, the physical function of filling a cable with a filling material is straight forward, the selection of the nature and kind of filler material is not. One must consider the hydrophobic nature of the materials used, stability on aging, low temperature properties, flow characteristics at elevated temperatures, processing characteristics, handling characteristics, dielectric properties, shrinkage, toxicity and cost, just to name the important ones.

The structure of electrical communications cables, such as telephone cables, involves assembly of twisted pairs of insulated conductors in a core surrounded by a helically wound or longitudinally applied heat barrier wrap, with or without a metallic shield or armor and finally a polymeric jacket. Cables containing optical waveguides are generally smaller in comparison to their twisted pair cousins, but have a similar structure.

Water, in the vapor or liquid form, may enter and displace air inside unfilled cables by the process of diffusion pumping through the polymeric jacket, or by migration through open cable ends, leaky splices or flooded terminals, or through manufacturing defects and other openings in the protective materials resulting from lightening strike, mechanical damage or rodent attack. This water increases the transmission loss of electrical or light signals and thus severely degrades the performance of communications cables. In addition, corrosive effects of water on metal components may result in an open electrical circuit.

As a remedy, the prior art teaches the filling of the interstitial space within a cable with waterproofing or so-called filling material. These materials are usually greaselike compositions and by the virtue of their physical presence in a cable, they effectively block the entry and migration of water. However, even grease filled cables have inherent problems. In filled electrical communications cable, thicker insulation is required to obtain the same mutual capacitance of the pairs of conductors as in unfilled or air-core type cables. As a result, the cables become larger, heavier and more expensive. Due to the greasy nature of the filling materials, handling becomes more involved for filled electrical and for filled light waveguide cables, resulting in reduced splicing efficiency. Also, flow characteristics of the filling materials at elevated temperatures are such that they pose maintenance difficulties in aerial installations. Moreover, the filled cables are heavier and they become stiff in cold climates and are difficult to install.

The state of the prior art relevant to the instant invention is best described by U.S. Pat. Nos. 3,607,487; 3,717,716; 3,683,104; 3,843,568; 3,879,575; 4,176,240 and the applicant's co-pending patent application Ser. No. 146,339, filed May 2, 1980, which is a continuation-in-part of application Ser. No. 106,866, filed Dec. 26, 1979, now abandoned.

U.S. Pat. No. 3,683,104, issued in 1972, and U.S. Pat. No. 3,843,568, issued in 1974, disclose heat-resistant mixtures of petrolatum and partially crosslinked polymers to which hollow synthetic thermoplastic particles prepared from a copolymer of styrene and acrylonitrile are added.

U.S. Pat. No. 3,879,575, issued in 1975, disclosed waterproofing compounds for protecting electrical conductor splice points. The compunds are blends of from 84.5 to 92.5 parts by weight of mineral oil, from 0.5 to 3.0 parts by weight of styrene-isoprene-styrene block copolymer, and from 6.0 to 13.0 parts by weight of polyethylene having a weight average molecular weight above 2000.

Materials that exhibit some of the properties desirable in a filling mixture and which have been used widely in the communications industry are described in U.S. Pat. Nos. 3,607,487 and 3,717,716 which disclose a petroleum jelly, mixed with a polymer (usually polyethylene) to impart consistency and prevent flowing in warm temperatures. Additionally, in U.S. Pat. No. 4,176,240 a cable filler is disclosed which is composed of a styrene-ethylene-butylene-styrene block copolymer dissolved in ASTM Type 104A (naphthenic) mineral oil with polyethylene added for consistency. This filler is represented to be an improvement over petroleum jelly or petrolatum compounds of the prior art. In Applicant's co-pending application Ser. No. 146,339, filed May 2, 1980, entitled "Filler Materials for Communications Cables," filling materials are disclosed which use petrolatum as a base, and contain either polyethylene or glycerol hydroxy stearate as preferred embodiments and glass or ceramic type microspheres.

SUMMARY OF THE INVENTION

This invention is an improvement of the inventions disclosed in the above-mentioned prior art and more particularly an improvement over the invention disclosed to U.S. Pat. No. 4,176,240, issued Nov. 27, 1979. The improved filling material of the instant invention is a mixture of a mineral oil, a rubber, inorganic hollow microspheres, and, if desired, polyethylene or glycerol hydroxy stearate.

The aforementioned basic ingredients (oil, rubber, microspheres and, if desired, an additive such as polyethylene or glycerol hydroxy stearate) formulated in the proportions described in Table 3 comprise cable filling material that meets the functional requirements of cable technology, has handling characteristics of those alleged in U.S. Pat. No. 4,176,240—in some instances, improved drip points—and in most every instance reduced dielectric constant, density, and shrinkage.

DETAILED DESCRIPTION OF THE INVENTION

Figure 1:
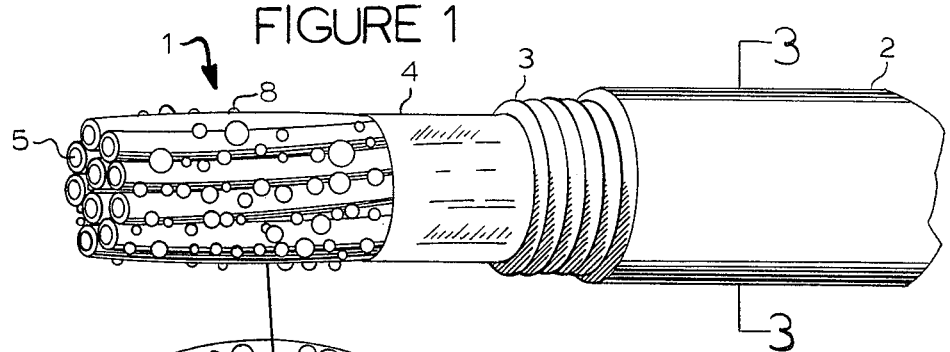
FIG. 1 is a cut-away view of a portion of a communications cable, made in accordance with the invention, various portions of the cable being exposed for illustrative purposes.

Specifically, this invention relates to filling materials which, while having superior waterproofing, handling and low temperature flexibility properties comparable to those of the materials disclosed in U.S. Pat. Nos. 3,879,575 and 4,176,240, has improved dielectric, high temperature drip and density characteristics. Compared to other filling materials used today, the lower dielectric constants of these new filling materials (containing hollow microspheres), permit a significant reduction of the thickness of the electrical wire insulation. As a result, wire bundles are smaller, with consequent savings in cable jacketing and shielding materials. Electrical cable containing the new filling materials has a smaller diameter in comparison to prior art cables not employing hollow microspheres, is lighter and yet it has signal transmission characteristics comparable to a conventionally filled cable.

Unlike the hollow organic thermoplastic microspheres used in filling materials reported in U.S. Pat. Nos. 3,683,104 and 3,843,568, the inorganic glass or ceramic hollow microspheres used in the instant invention are stable at temperatures well in excess of 80° C. and will withstand pressures up to approximately 250 psi and no more than 10 percent collapse.

While exhibiting the same superior dielectric, density and waterproofing characteristics of the materials disclosed in applicant's co-pending patent application Ser. No. 146,339, filed May 2, 1980, the instant filling materials have considerably improved handling, low temperature flexibility and high temperature drip characteristics.

Filling materials that find application in the manufacture of filled electrical and light waveguide cables of this invention are mixtures of:
(1) styrene-ethylene-butylene-styrene (SEBS), styrene-butadiene-styrene (SBS) or styrene-isoprene-styrene (SIS) type block copolymer (constituents A through D) and
(2) paraffinic and naphthenic type mineral oils with a minimal content of aromatic hydrocarbons (constituents H through N), optionally containing a small amount of antioxidant (constituents T and U) and
(3) inorganic (glass or ceramic) hollow microspheres (constituents O through S) and, if desired,
(4) an additive such as low molecular weight polyethylene or glycerol hydroxy stearate (constituents E through G) blended in the mineral oil. The use of an additive is not essential. A satisfactory filling material can be made by using (1), (2) and (3) only as exemplified by Examples 74 to 82. See Table 3.

The various ingredients that can be employed in this invention, their typical properties, and designations which identify them are described as follows:

SEBS block copolymers preferably have a styrene to rubber ratio of 0.39 to 0.41, and a specific gravity of approximately 0.91. Such preferred SEBS block copolymers are available from Shell Chemical Company, Houston, Tex., under trade designations of Kraton G-1650 (constituent A) and Kraton G-1652 (constituent B).

SBS block copolymers preferably have a styrene to rubber ratio of approximately 0.39 and a specific gravity of approximately 0.94. One such preferred SBS block copolymer is Kraton 1102 (constituent C), available from Shell Chemical Company, Houston, Tex.

SIS block copolymers have a styrene to rubber ratio of approximately 0.16, and a specific gravity of 0.92. One such preferred SIS block copolymer is Kraton 1107 (constituent D), available from Shell Chemical Company, Houston, Tex.

Additive agents such as low molecular weight polyethylene and glycerol hydroxy stearate may be employed, if desired, to obtain a desirable consistency and compound flow characteristic at an elevated temperature and/or to aid in the dispersement of the microspheres throughout the other materials. Their use, however, is not essential. Preferably, the polyethylenes has a specific gravity of at least 0.90 and a molecular weight range of from 1500 to 5000. Preferred polyethylene used in the instant invention have specific gravities of 0.93 and 0.94 and a molecular weight of approximately 3500 and are manufactured by Allied Chemicals of Morristown, N.J. and sold under marks C-8 (constituent E) and AC-9 (constituent F). Other low molecular weight polyethylenes are also operable. Alternatively, glycerol hydroxy stearate may be used for the same purpose or purposes as the polyethylene. One such preferred glycerol hydroxy stearate is available under the trademark Loxiol G-15 (constituent G) from Henkel Inc., Fort Lee, N.J. It has a drop point of 85° to 90° C., the drop point being defined as the temperature at which the stearate actually drops off of the bulb of a thermometer.

Mineral oils (constituents H through N), employed as solvents or fluid media for constituents A through G are paraffinic and naphthenic types, or blends thereof, and preferably have a minimal content of aromatic hydrocarbons. It is preferable that their viscosity gravity constant (VGC: as determined by ASTM D 2501-67) be between 0.79 and 0.84. Various commercially available mineral oils have desirable VGCs and examples of such oils are listed in Table 1, which can be blended to fit the definition of paraffinic naphthenic mineral oil as herein below set forth. Constituent H does not contain an antioxidant additive, whereas constituents I to N contain 2 to 3 parts per million of Vitamin E. Antioxidant additives normally used with polyolefin cable filling materials are also useful in the present composition. Two such satisfactory additives are available from Ciba Geigy of Ardsley, N.Y., under the marks Irganox 1010 (constituent T) and Irganox 1035 (constituent U).

Hollow glass microspheres manufactued by Minnesota Mining and Manufacturing Corporation and sold under the marks "3M" Brand Glass Bubbles C15/250, "3M" Brand Glass Bubbles B15/250, "3M" Brand Glass Bubbles A16/500 and "3M" Brand Glass Bubbles E22X have been found satisfactory. Properties of such glass microspheres are listed in Table 2: constituents O–R.

Hollow ceramic microspheres manufactured by Emerson and Cuming, Inc. of Canton, Mass., and sold under the trademark of Eccospheres FA-A have been found satisfactory: constituent S. Properties of such ceramic microspheres are listed in Table 2.

The filling materials of this invention are prepared by heating the mineral oil and antioxidant to about 300° F. until the antioxidant is completely dissolved, followed by additions of polyethylene or stearate and the rubber copolymer, with stirring and heating until a clear homogeneous blend is obtained, as is well known in the art. The inorganic hollow microspheres are then added and mixed.

To facilitate an understanding of the invention, specific but non-limitative embodiments of the cable filling compositions and their relevant properties, e.g. drip temperatures, are herein presented in tabular form, Table 3. As disclosed in Table 3, several of the disclosed filling material formulations exhibit drip temperatures of approximately 75° C., yet they are found to remain flexible at temperatures as low as −40° C.

For the purpose of this disclosure, the following terms have the following meanings:

(a) "Paraffinic mineral oil" means a mineral oil having a viscosity-gravity constant, as determined by the procedure specified in the American Society of Testing Materials (ASTM) D 2501-67 procedure, between 0.78 and 0.85 inclusive with a minimum of 65 percent paraffinic carbon atoms and a maximum of 5 weight percent aromatic carbon atoms.

(b) "Naphthenic mineral oil" means a mineral oil having a viscosity-gravity constant, as determined by the procedure specified in the American Society of Testing Materials D 2501-67 procedure, between 0.78 and 0.85 inclusive with a minimum of 35 percent naphthenic carbon atoms and a maximum of 5 percent aromatic carbon atoms.

(c) "Glass" means an inorganic compound having ionic bonding and little or no crystalline structure, e.g. a solid solution of fused silicates of varying composition.

(d) "Ceramic" means crystalline inorganic particulate matter bonded together in a mass by means of either a glassy phase and/or solid state sintering.

(e) "Drip temperature" refers to the highest temperature for which neither a portion of the cable filling material nor a component thereof (e.g. oil) separates or flows when several conductors of a cable coated with the filling material are hung, open ended, in a vertical position for 24 hours. To determine "drip temperature" properties of the disclosed filling materials, the coated test samples were heated at constant temperatures of 60°, 65°, 71° and 75° C. (±1° C.) for 24 hours.

TABLE 1

| Constituent | Mineral Oil Shell Chemical Co. Houston, Texas | C-Atom Analysis (%) | | | Viscosity-Gravity Constant (ASTM D 2501-67) |
|---|---|---|---|---|---|
| | | Paraffinic | Naphthenic | Aromatic | |
| H | Shellflex 371 | 53 | 46 | 1 | 0.835 |
| | Penreco Butler, Pa. 16001 | | | | |
| I | Drakeol 35 | 60 | 40 | — | 0.820 |
| J | Drakeol 34 | 70 | 30 | — | 0.802 |
| K | Drakeol 19 | 63 | 37 | — | 0.813 |
| L | Drakeol 5 Blend | 73 | 27 | — | 0.815 |
| M | Draketex 50 | 75 | 25 | — | 0.798 |
| N | Peneteck | 80 | 20 | — | 0.804 |

TABLE 2

| Constituent | Type of Hollow Inorganic Micropheres | Particle (Diameter) Size Range | Particle Density Range g/cm³ (Nominal) |
|---|---|---|---|
| | Glass Minnesota Mining and Manufacturing Corporation St. Paul, Minn. | | |
| O | Type 3M C15/250 | 20–200 Microns | 0.12 to 0.18 (0.15) Ave |
| P | Type 3M B15/250 | 20–200 Microns | 0.12 to 0.18 (0.15) Ave |
| Q | Type 3M A16/500 | 20–200 Microns | 0.14 to 0.18 (0.16) Ave |

TABLE 2-continued

| Constituent | Type of Hollow Inorganic Micropheres | Particle (Diameter) Size Range | Particle Density Range g/cm³ (Nominal) |
|---|---|---|---|
| R | Type 3M E22X Ceramic Emerson & Cuming, Inc. Canton, Mass. | 10-100 Microns | 0.19 to 0.25 (0.22) Ave |
| S | Eccospheres FA-A | 60-325 Microns | (0.65) Ave |

The low dielectric constant of the hollow microspheres per se is believed to be a factor in overall composite dielectric constant of the mixtures of which it forms a part, which is comparatively less than that which would be expected from mixtures of disclosed rubbers and mineral oils or rubbers, mineral oils and additives per se. It has been experimentally established that the low density glass hollow microspheres are more effective in reducing dielectric constant values of the mixtures than the relatively heavier ceramic hollow micropheres. Use of the low dielectric constant filling materials of the instant invention allows a significant reduction in the electrical insulation thickness over copper conductors without impairing the electrical characteristics and transmission performance of filled cables, thus achieving significant savings in materials used in manufacturing electrical communications cables.

The composite densities of the filling materials of this invention are considerably lower, especially those compositions containing 13 percent or more microspheres, than that of petrolatum per se or of other filling materials. This reduced density permits a longer cable filled with a given weight of the new filling material, the resulting cable being lighter in weight and easier to handle than a conventionally filled cable of like dimensions. In comparison to prior art cable filler formulations using mineral oil and rubbers (U.S. Pat. No. 4,176,240), an overall reduction in the amount of so-called "free" mineral oil in a given length of filled cable is achieved by this invention, thus giving rise to another beneficial effect, viz., less mineral oil is free to deteriorate electrical insulation in the case of electrical communications cables or to cause transmission loss in light waveguide cables.

The filling materials of this invention have been observed to shrink less while cooling from higher application temperatures to lower room or service temperatures than the conventional filling materials, thus, making it possible to fill cables leaving fewer and smaller voids. This improvement is directly attributed to the presence of considerable volume of inorganic hollow microspheres which have very low coefficient of thermal expansion.

The mixtures described in Table 3 are less greasy and are easily removed from the conductors and from hands, clothes, tools and equipment in comparison to prior art disclosures known to applicant. In addition, reduced free oil content of the filling materials and retention of mineral oil on the surface of the inorganic hollow microspheres improves the compatibility of the electrical conductors with splicing materials.

Set forth in Table 3 are Examples 1 through 82 of various formulations contemplated by this invention. In this table, the letters A through S inclusive refer to constituents of like designation previously described in the text above and/or in Tables 1 and 2.

TABLE 3

| EXAMPLE | COMPOSITION PERCENT BY WEIGHT | DRIP TEMPERATURE °C. | DIELECTRIC CONSTANT |
|---|---|---|---|
| 1 | A-30 E-1 I-68 O-1 | >60° C. | 2.14 |
| 2 | A-25 E-3 I-65 O-7 | 75° C. | 1.70 |
| 3 | A-1 E-8 I-71 O-20 | 75° C. | 1.48 |
| 4 | A-1 E-13 I-71 O-15 | 75° C. | 1.60 |
| 5 | A-8 E-3 I-75 O-14 | 75° C. | 1.59 |
| 6 | A-6 F-2 I-80 O-12 | 75° C. | 1.67 |
| 7 | A-6 E-2 I-81 P-11 | 75° C. | 1.65 |
| 8 | A-6 E-2 I-80 | 75° C. | 1.70 |

TABLE 3-continued

| EXAMPLE | COMPOSITION PERCENT BY WEIGHT | DRIP TEMPERATURE °C. | DIELECTRIC CONSTANT |
|---|---|---|---|
| 9 | Q-12<br>A-8<br>E-2<br>I-75<br>R-15 | 75° C. | 1.76 |
| 10 | A-6<br>E-2<br>I-60<br>S-32 | 75° C. | 2.15 |
| 11 | A-8<br>E-3<br>I-77.8<br>O-11<br>T-0.2 | 75° C. | 1.70 |
| 12 | A-8<br>E-3<br>I-77.5<br>O-11<br>T-0.5 | 75° C. | 1.71 |
| 13 | A-10<br>E-4<br>H-74.8<br>O-11<br>U-0.2 | 75° C. | 1.70 |
| 14 | A-10<br>E-4<br>H-74.5<br>O-11<br>U-0.5 | 75° C. | 1.68 |
| 15 | A-30<br>E-1<br>J-68<br>O-1 | 75° C. | 2.00 |
| 16 | A-1<br>E-8<br>J-71<br>O-20 | 75° C. | 1.48 |
| 17 | A-1<br>E-13<br>J-71<br>O-15 | 75° C. | 1.57 |
| 18 | A-8<br>E-3<br>J-75<br>O-14 | 75° C. | 1.55 |
| 19 | A-6<br>E-2<br>J-80<br>O-12 | 75° C. | 1.68 |
| 20 | A-6<br>F-2<br>J-80<br>O-12 | 75° C. | 1.67 |
| 21 | A-6<br>E-2<br>J-82<br>P-10 | 75° C. | 1.65 |
| 22 | A-6<br>E-2<br>J-78<br>Q-14 | 75° C. | 1.69 |
| 23 | A-8<br>E-2<br>J-75<br>R-15 | 75° C. | 1.74 |
| 24 | A-6<br>E-2<br>J-57<br>S-35 | 75° C. | 2.15 |
| 25 | A-8<br>E-8<br>K-74<br>O-10 | 75° C. | 1.62 |
| 26 | A-8<br>E-8<br>L-74<br>O-10 | 75° C. | 1.65 |
| 27 | A-8<br>E-8<br>M-74 | 75° C. | 1.67 |

TABLE 3-continued

| EXAMPLE | COMPOSITION PERCENT BY WEIGHT | DRIP TEMPERATURE °C. | DIELECTRIC CONSTANT |
|---|---|---|---|
| 28 | O-10<br>A-6<br>E-8<br>N-74 | 75° C. | 1.62 |
| 29 | O-12<br>A-8<br>E-8<br>N-75 | 75° C. | 1.76 |
| 30 | P-9<br>A-10<br>E-8<br>N-72 | 75° C. | 1.79 |
| 31 | Q-10<br>A-10<br>E-8<br>N-76 | 75° C. | 1.71 |
| 32 | R-15<br>A-10<br>E-8<br>N-52 | 75° C. | 1.97 |
| 33 | S-30<br>B-30<br>E-1<br>I-68 | 75° C. | 2.10 |
| 34 | O-1<br>B-1<br>E-8<br>I-71 | 75° C. | 1.42 |
| 35 | O-20<br>B-1<br>E-13<br>I-71 | 75° C. | 1.56 |
| 36 | O-15<br>B-8<br>E-2<br>I-76 | 75° C. | 1.60 |
| 37 | O-14<br>B-6<br>F-2<br>I-80 | 75° C. | 1.67 |
| 38 | O-12<br>B-8<br>E-3<br>I-77.8<br>O-11 | 75° C. | 1.70 |
| 39 | U-0.2<br>B-8<br>E-3<br>I-77.5<br>O-11 | 75° C. | 1.69 |
| 40 | U-0.5<br>B-10<br>E-4<br>H-74.8<br>O-11 | 75° C. | 1.68 |
| 41 | T-0.2<br>B-10<br>E-4<br>H-74.5<br>O-11 | 75° C. | 1.67 |
| 42 | T-0.5<br>B-30<br>E-1<br>J-68 | 75° C. | 2.11 |
| 43 | O-1<br>B-1<br>E-8<br>J-71 | 75° C. | 1.45 |
| 44 | O-20<br>B-1<br>E-13<br>J-71 | 75° C. | 1.51 |
| 45 | O-15<br>B-8<br>E-3<br>J-75 | 75° C. | 1.63 |
| 46 | O-14<br>B-6<br>F-2<br>J-80 | 75° C. | 1.67 |

TABLE 3-continued

| EXAMPLE | COMPOSITION PERCENT BY WEIGHT | DRIP TEMPERATURE °C. | DIELECTRIC CONSTANT |
|---|---|---|---|
| 47 | O-12<br>B-10<br>E-8<br>N-72 | 75° C. | 1.76 |
| 48 | Q-10<br>B-10<br>E-8<br>N-67<br>R-15 | 75° C. | 1.73 |
| 49 | C-7<br>E-5<br>I-74<br>O-14 | 65° C. | 1.62 |
| 50 | C-10<br>E-3<br>M-72<br>O-15 | 71° C. | 1.97 |
| 51 | C-9<br>E-4<br>N-72.8<br>O-14<br>U-0.2 | 71° C. | 2.01 |
| 52 | D-8<br>E-5<br>I-73<br>O-14 | 75° C. | 1.62 |
| 53 | D-12<br>E-3<br>N-70<br>O-15 | 75° C. | 1.54 |
| 54 | D-9<br>E-4<br>N-72.5<br>O-14<br>U-0.5 | 75° C. | 1.73 |
| 55 | A-6<br>G-2<br>I-82<br>P-10 | 71° C. | 1.84 |
| 56 | A-6<br>G-2<br>I-80<br>Q-12 | 75° C. | 1.85 |
| 57 | A-8<br>G-2<br>I-75<br>R-15 | 65° C. | 1.82 |
| 58 | A-6<br>G-2<br>I-62<br>S-30 | 75° C. | 2.03 |
| 59 | A-8<br>G-3<br>I-75<br>O-14 | 75° C. | 1.73 |
| 60 | A-10<br>G-4<br>I-72<br>O-14 | 75° C. | 1.77 |
| 61 | A-8<br>G-3<br>J-75<br>O-14 | 75° C. | 1.66 |
| 62 | A-10<br>G-4<br>J-70<br>O-16 | 75° C. | 1.70 |
| 63 | A-6<br>G-2<br>J-82<br>P-10 | 75° C. | 1.80 |
| 64 | A-6<br>G-2<br>J-80<br>Q-12 | 75° C. | 1.76 |
| 65 | A-8<br>G-2<br>J-76<br>R-14 | 71° C. | 1.75 |
| 66 | B-8 | | |

TABLE 3-continued

| EXAMPLE | COMPOSITION PERCENT BY WEIGHT | DRIP TEMPERATURE °C. | DIELECTRIC CONSTANT |
|---|---|---|---|
|  | G-3 I-75 O-14 | 71° C. | 1.73 |
| 67 | B-10 G-4 I-72 O-14 | 71° C. | 1.81 |
| 68 | B-8 G-3 J-75 O-14 | 65° C. | 1.70 |
| 69 | B-10 G-4 J-72 O-14 | 75° C. | 1.86 |
| 70 | B-7 G-2 M-81 P-10 | 75° C. | 1.73 |
| 71 | B-6 G-2 M-80 Q-12 | 75° C. | 1.68 |
| 72 | B-8 G-3 M-74 R-15 | 75° C. | 1.75 |
| 73 | B-6 G-2 M-64 S-28 | 75° C. | 2.23 |
| 74 | A-29 I-70 O-1 | 75° C. | 2.08 |
| 75 | A-20 I-75 O-5 | 75° C. | 1.88 |
| 76 | A-6 I-93 O-1 | <55° C. | 2.11 |
| 77 | A-1 I-79 O-20 | <55° C. | 1.57 |
| 78 | A-8 I-76.5 O-15 T-0.5 | 60° C. | 1.65 |
| 79 | B-8 J-73.8 R-18 T-0.2 | <55° C. | 1.72 |
| 80 | C-9 M-74.5 Q-16 T-0.5 | <55° C. | 1.66 |
| 81 | D-10 N-74.8 O-15 U-0.2 | 55° C. | 1.59 |
| 82 | A-3 H-61.5 S-35 U-0.5 | <55° C. | 2.21 |

DESCRIPTION OF THE PREFERRED EMBODIMENTS

Filling materials of the instant invention are mixtures of the following basic ingredients:
(a) A styrene block copolymer rubber;
(b) Paraffinic or naphthenic type mineral oils with a minimal content of aromatic hydrocarbons;
(c) Inorganic hollow microspheres; and, if desired,
(d) Additives such as polyethylene or glycerol hydroxy stearate.

Examples 1 through 82 represented in Table 3 are composed of basic ingredients (a) through (c) and optionally (d) and disclose mixtures composed of 1 to 30 percent by weight of styrene block copolymers, 52 to 82 percent by weight of either naphthenic or paraffinic mineral oils, 1 to 31 percent by weight of inorganic hollow microspheres, such as ceramic or glass microspheres; and, if desired, 1 to 13 percent by weight of an additive such as polyethylene or glycerol hydroxy stearate. Within these disclosed ranges, the preferred embodiments and best mode of carrying out the invention known to applicant are represented by examples 5, 19, 36, 45, 59, 61, 66, 68, 74 and 78.

Referring to element (a) of the filling material mixture, applicant has found that the below-listed compounds are operable and give satisfactory results within the identified weight ranges:

Styrene Block Copolymer Rubber (i) 1 to 30 percent by weight of styrene-ethylene-butylene-styrene block copolymer having a styrene to rubber ratio of approximately 0.4 and a specific gravity of approximately 0.91;

(ii) 7 to 10 percent by weight of a styrene-butadiene-styrene block copolymer having a styrene to rubber ratio of approximately 0.39 and a specific gravity of approximately 0.94;

(iii) 8 to 12 percent by weight of styrene-isoprene-styrene block copolymer having a styrene to rubber ratio of approximately 0.16 and a specific gravity of approximately 0.92.

With regards to element (b), mineral oil, of the filling compound, applicant has found that paraffinic mineral oil and naphthenic mineral oil are operable and give satisfactory results within the below-listed weight ranges:

(i) 60 to 80 percent by weight of paraffinic mineral oil having a viscosity-gravity constant (ASTM D 2501-67) of approximately 0.78 to 0.85 with a minimum of 65 percent paraffinic carbon atoms and a maximum of 5 percent aromatic carbon atoms; and (ii) 60 to 80 percent by weight of naphthenic mineral oil having a viscosity-gravity constant (ASTM D 2501-67) of approximately 0.78 to 0.85 with a minimum of 35 percent naphthenic carbon atoms and a maximum of 5 percent aromatic carbon atoms.

With regard to element (c), inorganic microspheres, applicant has found that the below-listed glass and ceramic microspheres are operable and give satisfactory results within the indicated weight ranges:

(i) 1 to 20 percent by weight of inorganic hollow microspheres made from glass, having a particle size (diameter) between 10 and 200 microns and a particle density range of approximately 0.1 to 0.3 g/cm$^3$; and (ii) up to 35 percent by weight of inorganic hollow microspheres made from ceramic materials, having a particle size (diameter) between 60 and 325 microns and a particle density of approximately 0.6 g/cm$^3$.

With regard to the additives, if used, element (d) of the filling material, applicant has found that low molecular weight polyethylene and/or glycerol hydroxy stearate are operable and give satisfactory results at the weight ranges as set forth below:

(i) 1 to 13 percent by weight of low molecular weight polyethylene having a specific gravity of at least 0.9 and a molecular weight range from 1500 to 5000;

(ii) 2 to 4 percent by weight of glycerol hydroxy stearate having a dropping or melting point of 80° to 90° C.

It is to be understood that the above-identified percentages by weight of elements (a), (b), (c) and (d) of the disclosed invention may be chosen in a manner that the resulting composition totals 100% and the particular amount of a given ingredient falls within the weight ranges set forth above. In some instances, up to 0.5 percent by weight of an antioxidant may be dissolved in the mineral oil.

The styrene block copolymer rubbers of element (a) all belong to the same art recognized and/or chemical class, i.e. block copolymer rubbers. A like statement can be said of ingredient (b), i.e. the oils are all mineral oils.

The inorganic microspheres of ingredient (c) all contain material within the recognized class of glass or ceramic materials, are hollow, and thus light weight, and have the common property of significantly contributing to the low composite dielectric constant of the mixture of elements (a), (b), (c) and (d). The additives, element (d), possess at least one common property within the disclosed filling material mixture of elements (a), (b), (c) and (d). They facilitate the dispersion of microspheres within the copolymer and mineral oil, impart added viscosity and contribute towards higher drip points of the final mixtures in those cases where such modifications are desirable.

Examples 1–73 all contain the three basic ingredients (a rubber, mineral oil, microspheres) plus an additive. The vast majority of these examples have drip temperatures in excess of 65° C., most being 75° C. and a dielectric constant of 1.42 to 2.23. Examples 74 to 82 contain only the three basic ingredients, rubber, mineral oil and microspheres; they do not contain an additive of any sort. Some of these mixtures have drip temperatures up to 75° C. Their dielectric constants range 1.57 to 2.21. The additives are believed to make it easier to evenly disperse the microspheres through the mixture, increase the viscosity and in some formulations increase the drip point; however, their use is not necessarily essential as demonstrated by Examples 74 to 82, depending on the drip temperature desired.

DESCRIPTION OF THE DRAWINGS

As indicated in FIG. 1, element 1 shows in general a telecommunications cable employing the instant invention. Element 2 is a jacket which circumscribes a metallic shield, which in turn circumscribes a plastic core wrap member 4. A core, delimited by the core wrap 4, comprises a bundle of conductors 5, which by their very nature form interstitial spaces 6 between them. Either insulated electrical conductors or optical (light transmitting) waveguides, such as that disclosed in U.S. Pat. Nos. 3,884,550 and/or 3,711,262 incased in a tube-like member made of plastic like that of conventional insulation of an insulated electrical conductor can be used. For example, see FIG. 2 of U.S. Pat. No. 3,843,568.

Figure 2:
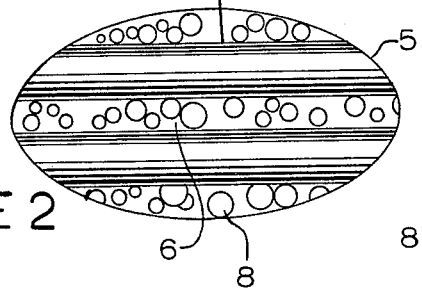
FIG. 2 is an exploded view of the conductors of FIG. 1, revealing interstices filled with the filling materials of the invention.

FIG. 2 is an exploded view of the left-hand terminal portion of the telecommunications cable of FIG. 1. It reveals interstices 6 between conductors 5 filled with a filling material comprising styrene block copolymer rubber 7 and microspheres 8.

Figure 3:
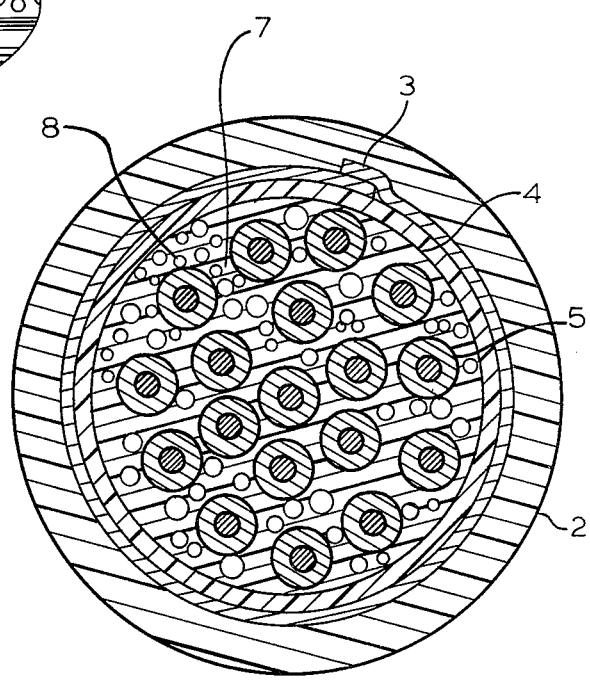
FIG. 3 is a cross section of the cable of FIG. 1 made according to the instant invention, showing a plurality of conductors, the interstitial spaces therebetween being filled with the filler material of the invention.

FIG. 3 is a cross section of the cable of FIG. 1 showing the electrical conductors 5, styrene block copolymer rubber, as element 7, or hollow inorganic (glass or ceramic) microspheres 8.

Figure 4:
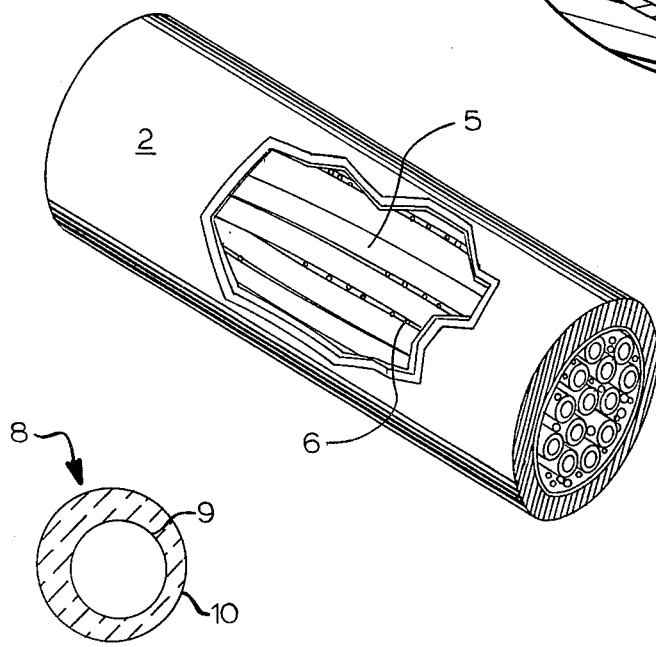
FIG. 4 is an isometric illustration of a cable having a plurality of conductors with spaces therebetween filled with cable filler material of the invention.

FIG. 4 shows an isometric illustration of a cable having a plurality of twisted conductors 5, twisted together so that they define a plurality of interstitial spaces 6, filled with styrene block copolymer rubber blended with oil and hollow inorganic microspheres 8.

Figure 5:
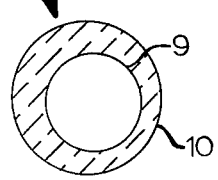
FIG. 5 is a cross section of the hollow microspheres shown in FIGS. 1 through 4.

FIG. 5 is a cross section of a typical hollow microsphere 8 of FIGS. 1 to 4. Element 9 denotes an airfilled core delimited by a spherical shaped wall 10 made of an inorganic material such as glass or ceramic material.

Cables containing the disclosed cable filler materials can be fabricated by suitable known apparatus and techniques well-known in the art. An exemplary technique for fabricating a twisted, multi-paired communications cable includes the steps of passing a plurality of conductors into a forming zone to produce a core and subsequently passing the thus made core through a stuffing box. The stuffing box is connected to a pump by means of a conduit which serves to transmit the cable filler material from the pump to the stuffing box. The cable filler material is passed through the side of the stuffing box at a predetermined temperature and under sufficient pressure to force it into the interstices between the several conductors. The stuffing box can be adjusted to provide a layer of the filling material around the periphery of the core of the conductors. The core is passed from the stuffing box to a core wrapping machine, which longitudinally or helically applies a strip of plastic (core wrap) around the core. If desired, the outermost surface of the core wrap may be coated with the filling material. Subsequently, the wrapped core is passed to a forming apparatus, which longitudinally folds a strip of aluminum or other metal tape around the core wrap in a conventional manner to form a shield 3. Aluminum strip 3, the shield, may have an adhesive coating of copolymer of ethylene acrylic acid on both sides for the purpose of achieving a bond between the overlapped edges of the strip and/or to a subsequently applied plastic jacket. After the shield is applied, the composite thus formed is passed through a cross head die attached to an extruder, which extrudes a layer of polyethylene around the shield to form a jacket, the heat of extrusion causing the shield to bond to the jacket, if so desired. The resulting cable is cooled and then collected on a take-up reel.

While the several foregoing steps can be formed individually with interruptions between steps, it is generally preferred that the cable be fabricated on a continuous basis to avoid the necessity of using storage reels between the several steps.

Although the invention has been described in considerable detail, such detailed description is only for the purpose of illustrating specific embodiments. It is evident that variations and modifications can be made from those described without departing from the spirit and scope of the invention.

What is claimed is:

1. A composition of matter composed of a mixture consisting essentially of of a styrene block copolymer rubber, mineral oil, and inorganic hollow microspheres, wherein:
   (a) the amount and type of said block copolymer rubber is either:
      (i) 1 to 30 percent by weight of styrene-ethylene-butylene-styrene block copolymer having a styrene to rubber ratio of approximately 0.4 and a specific gravity of approximately 0.9;
      (ii) 7 to 10 percent by weight of styrene-butadiene-styrene block copolymer having a styrene to rubber ratio of approximately 0.39 and a specific gravity of approximately 0.94; and
      (iii) 8 to 12 percent by weight of styrene-isoprene-styrene block copolymer having a styrene to rubber ratio of approximately 0.16 and a specific gravity of approximately 0.92;
   (b) wherein said mineral oil is either:
      (i) 60 to 80 percent by weight of paraffinic mineral oil having a viscosity-gravity constant (ASTM D 2501-67) of approximately 0.78 to 0.85 with a minimum of 65 percent paraffinic carbon atoms and a maximum of 5 percent aromatic carbon atoms; or
      (ii) 60 to 80 percent by weight of naphthenic mineral oil having a viscosity-gravity constant (ASTM D 2501-67) of approximately 0.78 to 0.85 with a minimum of 35 percent naphthenic carbon atoms and a maximum of 5 percent aromatic carbon atoms; and
   (c) said inorganic hollow microspheres are either:
      (i) 1 to 20 percent by weight of inorganic hollow microspheres made from glass, having a particle diameter between 10 and 200 microns and a particle density range of approximately 0.1 to 0.3 g/cm$^3$; or
      (ii) up to 35 percent by weight of inorganic hollow microspheres made from ceramic materials, having a particle diameter between 60 and 325 microns and a particle density of approximately 0.6 g/cm$^3$.

2. A composition of matter as set forth in claim 1 containing an additive and said additive is either:
   (i) 1 to 13 percent by weight of low molecular weight polyethylene having a specific gravity of at least 0.90 and a molecular weight range from 1500 to 5000; or
   (ii) 2 to 4 percent by weight of glycerol hydroxy stearate having a dropping point of 85° to 90° C.

3. A composition of matter as set forth in claim 1 or 2 wherein up to 0.5 weight percent of antioxidant additive is dissolved in said mineral oil.

* * * * *